Feb. 9, 1971        D. R. CRAIG        3,562,785

IMAGE ADJUSTING METHOD

Original Filed June 17, 1965

INVENTOR
DWIN R. CRAIG

Colton + Stone

ATTORNEY

United States Patent Office 3,562,785
Patented Feb. 9, 1971

3,562,785
IMAGE ADJUSTING METHOD
Dwin R. Craig, Gaithersburg, Md., assignor to Logetronics, Inc., Alexandria, Va., a corporation of Delaware
Division of application Ser. No. 681,940, Nov. 9, 1967, which is a continuation of application Ser. No. 464,817, June 17, 1965, which in turn is a continuation-in-part of application Ser. No. 101,701, Apr. 10, 1961. This application Nov. 20, 1968, Ser. No. 777,360
The portion of the term of the patent subsequent to Feb. 3, 1987, has been disclaimed
Int. Cl. G01j 1/00, 1/36
U.S. Cl. 250—204    6 Claims

ABSTRACT OF THE DISCLOSURE

Measurement of the degree of focus of an image wherein a pair of light sensitive elements are exposed to the image. In a first embodiment, a pair of photoconductive elements are physically positioned in different focal planes while, in a second embodiment, a light diffusing medium is associated with one of a pair of photosensitive elements whereby that element will receive only average or background illumination. In both embodiments, as the degree of focus of image is varied, an electrical output signal commensurate with focus will be generated.

---

This application is a division of copending application Ser. No. 681,940 filed Nov. 9, 1967. Application Ser. No. 681,940 was a continuation of application Ser. No. 464,-817 filed June 17, 1965, now abandoned. Application Ser. No. 464,817 was, in turn, a continuation-in-part of application Ser. No. 101,701 filed Apr. 10, 1961, now abandoned.

This invention relates to image adjusting methods and apparatus rendering it possible to obtain an optimum sharpness of an image accurately and quickly.

The focusing of a projection system by eye is a very uncertain operation since the condition of best focus is not realized by an observer until after such condition has occurred. Consequently, the visual and manual focusing procedure which has been conventional for so long is always, at best, an interpolation between two bracketing conditions of visual focus. Other uncertainties are introduced in conventional focusing procedures when the spectral response of the eye does not match that of the recording emulsion, especially when the lens is not completely corrected for chromatic aberrations. Moreover, visual focusing at low light levels or with small images is exceedingly difficult to achieve.

Autofocus mechanisms involving mechanical linkages between the image-lens-object planes are restricted to use in enlargers and in copy cameras where the distance between the image and object is relatively small. Moreover, such mechanisms require careful calibration for each individual lens which is used. The accuracy of such mechanisms is adversely affected by wear, temperature changes and any lack of precision in arranging the image and object in the positions which they are intended to occupy. Thus, while autofocus mechanisms are frequently used, no great degree of dependability is ever expected of them.

The methods and apparatus contemplated by the present invention overcome the disadvantages of visual focusing and autofocus mechanisms, rendering it possible to sense the sharpness of an image positively and directly.

It is among the objects of the present invention to provide a method of determining image sharpness comprising projecting a real image of an object on a photoconductive surface of a photosensitive element, changing the sharpness of the image, sensing the change in conductance of said element produced by the change in light distribution on said surface resulting from the change in sharpness of said image, and sensing resulting changes in conductance of said element until a peak value of conductance is achieved. It is preferred that an electrical instrument be energized as a function of the response of the photoconductive surface. The adjustment may be automatic as a function of such response. One of the preferred embodiments contemplates the use of a plurality of such photoconductive surfaces in the projection path and adjusting the focus of the image as a function of the relative conductances of said elements. This is achieved by assuring that one of the surfaces receives a sharp image at the time that the other receives an unsharp image, as by arranging the surfaces at different distances respectively from the focal plane, or by interposing a diffusing body between the light source and one of the surfaces.

It is also among the objects of the present invention to provide an optical system comprising a light source; an object receiving light from the source; a photosensitive element having a continuous photoconductive layer defining an image receiving surface, a plurality of electrodes contacting spaced portions of the layer establishing a current path with the layer along the surface; a circuit including the electrodes, a voltage source, and signal responsive means; optical means receiving light from the obect for forming a real image of the object on the surface; and adjusting means for sharply focusing the image on the surface to prodoce a peak in the conductivity of the layer. The adjusting means may comprise an electric motor capable of responding to the signals produced. The invention also provides for automatic focusing means in circuit with the signal responsive means. It is also contemplated that a second photosensitive element having a photoconductive surface receive an amount of light proportional to that received by the first element and have a photoconductive layer whose conductivity is responsive to incident light intercepted thereby and unaffected by light distribution thereon, and means for comparing the ratio of conductivity of the elements. One of the elements is arranged to receive an unsharp image when another of the elements receives a sharp image, which arrangement may include disposing the photoconductive surfaces at different distances from the image forming means. The photoconductive layers are preferably spaced in a direction transverse to the principal axis of the image forming means, and these layers may be optically coincident. A defocusing element may be interposed between one of the surfaces and the object. The adjusting means may be connected to the signal responsive means for actuation thereby.

The invention also contemplates a method of establishing a predetermined distance from an object comprising projecting a real image of the object through an optical system of known focal length, interposing a photoconductive surface in the protection path, and adjusting the object-optical system distance relative to the optical system-photoconductive surface distance until the electrical response of the material attains a peak value.

The invention further contemplates a method of sensing the degree of coincidence in a plane of a plurality of similar images of an object illuminated by visible, infrared and ultraviolet radiations comprising directing a real image of the object towards the plane, introducing into the path of the radiations in the vicinity of the plane a photoconductive surface of prescribed characteristics responsive to the radiations, relatively moving the surface with respect to the plane to change the degree of coincidence of the images with respect to the plane, and thereby changing the electrical response of the surface, and producing electrical signals varying as a function of the response changes of the surface.

A more complete understanding of the invention will follow from a description of the accompanying drawings wherein.

Figure 1:
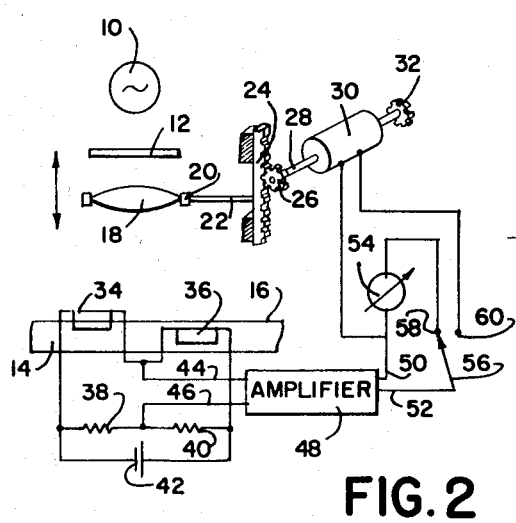
FIG. 1 is a diagrammatic illustration of one form of the invention.

Referring to FIG. 1 there is depicted a light source 10 to illuminate an object of which an image is to be formed, or which may itself be the object, as in the case of a distant star, for example. A support 12 is provided for a transparency of which an image is to be formed. An easel 14 provides a surface 16 on which it is desired to form a real image by means of the lens 18 shown as mounted in a support 20 which is secured to an arm 22 fastened to a rack 24 which is adjustable in a direction perpendicular to the image plane 16 by means of a pinion 26 carried by a shaft 28 for rotation by a reversible motor 30 or by a manually operated knob 32. In the path of light projected from the object and in the vicinity of the image plane 16, a pair of photocells 34 and 36 having photoconductive surfaces are arranged and connected as two arms of a Wheatstone bridge whose other arms are represented by the resistors 38 and 40. A battery 42 is connected in parallel with the series circuit containing the resistors and with the series circuit containing the photocells. A conductor 44 connected between the photocells and a conductor 46 connected between the resistors serve as output leads connected to the input side of an amplifier 48.

To the output of the amplifier 48 there are connected a pair of conductors 50 and 52, the conductor 50 being connected to one side of an electrical indicating instrument 54 and to one terminal of the motor 30. The conductor 52 is connected to an arm 56 of a selecting switch having a terminal 58 connected to the other side of the meter 54 and a terminal 60 connected to the other terminal of the motor 30.

Since the method depends only on the formation of a real image on the surface of the photoelectric element, it will be evident that the method will operate with light either reflected from the object or transmitted by the object.

For the portion of the description immediately following, it will be assumed that the support 12 carries a transparency having a repetitive pattern, such as a halftone screen in order that the two photocells will receive images from like portions of the object.

Figure 2:
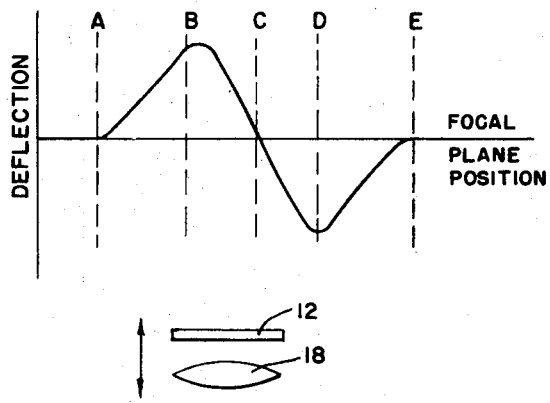
FIG. 2 is a curve depicting the response obtained in accordance with certain uses of the equipment depicted in FIG. 1.

Assuming that both of the photocells 34 and 36 are capable of receiving sharp images, the fact that the active surface of the photocell 34 lies above the image plane 16 and the active surface of the photocell 36 lies below the image plane 16, when the object is focused on the image plane, the lack of focus on the surfaces of the photocells 34 and 36 will produce diffused light. Assuming this condition to prevail and with the selector switch arm 56 connected to the terminal 58 so as to connect the meter 54 which may be an ammeter or microammeter, some of the types of readings indicated on the meter have been depicted in FIG. 2. Considering the abscissa as the position of the plane of focus and the ordinate as the deflection of the instrument, condition A represents the result of focusing the image above both of the photocells 34 and 36; position B represents the condition when the image is focused on the plane occupied by the active surface of the photocell 34; position C represents the condition when the image is focused in the image plane 16 intermediate the active surfaces of the two photocells; position D represents the condition when the image is focused on the active surface of the photocell; and position E represents the condition prevailing when the image is focused on a plane lying below both of the photocells.

This arrangement can be used to indicate when the image is in sharpest focus on the image plane 16. When automatic focusing is desired, it will be preferable for the image plane to lie halfway between the photoconductive surfaces of the photocells 34 and 36, corresponding to the position C depicted in FIG. 2. Consequently, this arrangement will indicate not only when the image is not in focus but will indicate the direction in which an adjustment must be made to bring the image into focus. Thus it will follow that this arrangement is of appreciable value where automatic focussing is to be employed since the polarity of the signal determines the direction in which the adjustment must be made. Such automatic focussing is achieved with reference to the equipment depicted in FIG. 1 by moving the arm 56 of the selector switch into contact with the terminal 60 so that the motor 30 will be energized to drive the rack 24 and the lens 18 towards and from the plane 16 to maintain the desired focused condition. Where the instrument 54 is used, the adjustment of the lens can be effected by means of the manually operated knob 32. It will be clear to those skilled in the art that the focussing adjustment can be achieved by moving the object, the image plane or the lens. Whereas a bridge circuit has been depicted in the drawings for measuring the ratio of conductivities of the photocells, any other ratio measuring circuit can be substituted.

The invention utilizes the characteristics of photoconductive cells, such as cadmium sulfide and cadmium selenide cells, whose conductances vary with the amount of light incident thereon. The conductance of such cells has been found to change also when the distribution of such incident light is varied, even where the total incident light remains unchanged. As a matter of fact, the conductance of such a cell changes quite abruptly at the point of sharp focus when the cell is moved through the focal plane of a projected halftone image. This phenomenon can be explained by considering the photoconductive surface as being a network of interconnected conductors, and the conductance of each element of such matrix being proportional to the light which is incident thereon. The total conductance of such a matrix will be, under certain conditions, different for uniform and non-uniform distribution of such light, despite the fact that the total amount of incident light remains constant.

Figure 6:
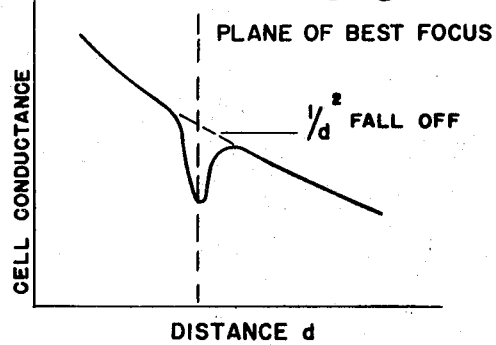
FIG. 6 is a curve illustrating the variation in response of a single photoconductive surface under different conditions of focus.

When such a photoconductive cell is moved through the plane of focus of a line screen, its conductance varies with the distance $d$, depicted in FIG. 6, wherein the broken line curve represents the conditions that would exist if the screen were replaced by a structureless filter of the same total transmittance. The phenomenon of image recognition by the surface of a photoconductive cell is based upon a property which is unique in the case of photoconductive cells, a property which is not exhibited by photovoltaic or photoemissive cells. In photoconductive cells, the local conductance of each incremental part of the photoconductive layer is directly proportional to its local illumination. Such a photoconductive cell can be envisioned as composed of a conductor matrix whose elements are grains in the sintered photoconductor, each of which grains is capable of measuring independently the light impinging thereon. For purposes of explanation, the object may be a plane having alternate opaque and clear lines such as those found on a conventional Ronchi ruling, and each elemental conductor will be assumed to be appreciably smaller than the smallest relevant detail in the image of the line target. Assuming that each line of the target covers an integral number of conductors in the matrix, the conductance of the matrix will be varied under differing conditions, exemplified by the following cases:

(1) A structureless filter in place of the target;
(2) A Ronchi ruling substituted for the filter having the same transmittance as the filter, so oriented that the lines of the projected image are aligned and perpendicular to the electrodes of the photoconductive cell; and
(3) A Ronchi ruling substituted for the filter having the same transmittance as the filter, so oriented that the lines of the projected image are aligned and parallel to the electrodes of the photoconductive cell.

Figure 7:
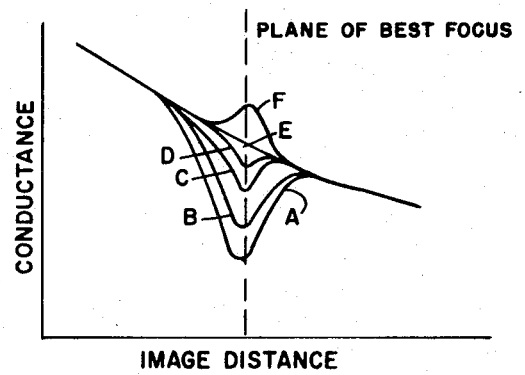
FIG. 7 is a curve illustrating the effects produced by rotating a sharply focused line target relative to the electrodes of a photoconductive cell.

The conductance of such a matrix has been plotted in FIG. 7 for a line target moving through focus wherein: curve A represents conditions where the projected lines of the Ronchi ruling are parallel to the electrodes of the photoconductive cell; curve E represents conditions where the projected lines of the Ronchi ruling are perpendicular to the electrodes of the photoconductive cell; and curve B, C and D represent intermediate positions of the projected lines relative to the electrodes.

Where $p$ is an exponent indicative of the linearity characteristics of a photoconductive cell, when its conductance is directly proportional to incident light, the cell is linear and $p=1$. Where $p$ exceeds or is less than unity, the cell is said to be non-linear.

Curves A through D of FIG. 7 represent conditions experienced when $p=1$. Where $p$ is less than unity, curve D illustrates conditions when the projected lines are perpendicular to the electrodes of the photoconductive cell. Where $p$ exceeds unity, curve F represents conditions when the projected lines are perpendicular to the electrodes of the photoconductive cell. Whereas these curves are merely schematic, they indicate that a dip where $p$ is less than unity can disappear when $p=1$, or change to a hump when $p$ exceeds unity.

Figure 3:
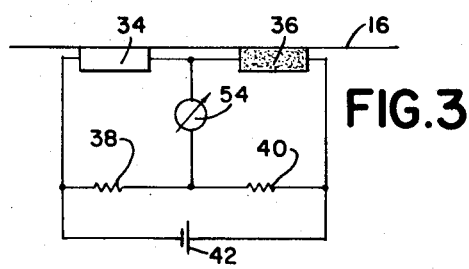
FIG. 3 is a diagrammatic representation depicting a variation of the arrangement in FIG. 1.
Figure 4:
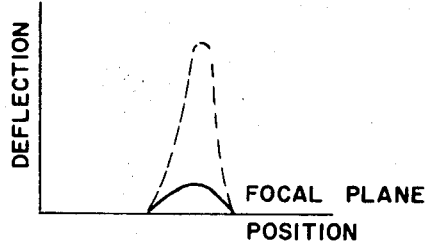
FIG. 4 is a curve produced with the equipment depicted in FIG. 3.

Similar results can be achieved with the slightly modified arrangement depicted in FIG. 3 where the active surfaces of both photocells 34 and 36 lie in the image plane 16 but the photocell 36 is prevented from receiving a sharp image by providing a diffusing film or body between it and the light source. With this arrangement, as depicted by the curve of FIG. 4, when one of the photocells receives a sharp image and the other a diffused image, their differences in conductivity will be a maximum as compared with the condition prevailing when the image is focused on neither of the photocells and the difference is zero. The solid line curve in FIG. 4 represents the deflection that would be produced with little or no amplification whereas the broken line curve depicts the results that would be achieved with amplification.

Figure 5:
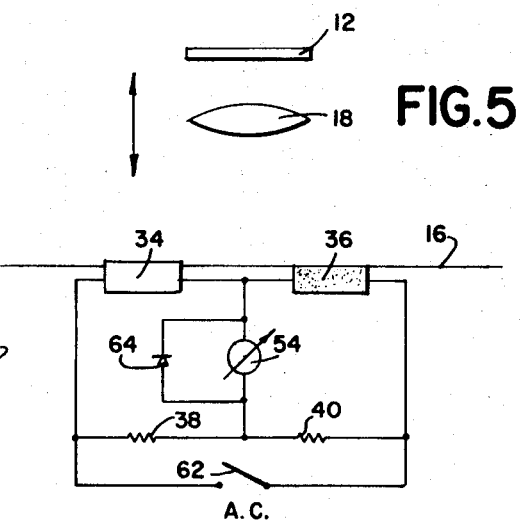
FIG. 5 is a diagrammatic representation of a variation of the invention adapted for the use of alternating current.

The arrangement depicted in FIG. 5 differs from that of FIG. 3 in that it uses a source of alternating current applied at the terminals 62 instead of the battery 42 of FIG. 3 and employs a rectifier 64 in parallel with the meter 54.

The principles of this invention are applicable by the use of a single photocell having a photoconductive surface of prescribed characteristics since a defocused image is the same as a diffused image. As will be represented by FIG. 6, as the lens 18 is moved towards and from the focal plane 16, the conductivity or resistance of the photocell changes when passing through the focus condition sufficiently to produce a deflection on a meter connected to the output of the photocell. Such a deflection might represent a change of perhaps 10% in the resistance of the photocell. Inasmuch as such a small change in a large value is not as desirable as a greater change in the form of a meter indication, and since changes in the light level might be confused with changes in the condition of focus, the use of two photocells will ordinarily be preferred.

Inasmuch as a sharply focused image differs from an unsharp image primarily in terms of their relative contrast or the brightness ratio between two adjacent points in the image, it becomes evident that the present invention is useful in distinguishing between a high contrast and a low contrast image or between a sharp and an unsharp image. Since the use of a meter will render the output quantitative, the invention can be employed to measure the contrast of an image or the degree of sharpness thereof and is not limited to the mere detection of a condition of sharpest focus.

When used as a measuring device, it will be evident that the meter will serve to indicate the optical quality of all elements involved in the formation of the image. This includes not only the optical quality of the object itself but also of any element introduced between the object and the image such as filters, mirrors, refractive undulations in the intervening space, dust or grease on the lens, haze or dust in the space, flare or light leaks permitting the entrance of non-image forming light. It will be evident that all of these factors contribute either to the unsharpness of the image or to loss in contrast.

The present invention is eminently suited to provide a visual aid in focusing enlargers, for calibrating the autofocus mechanisms of enlargers and cameras, to indicate any deviation from parallel between image and object planes, for lens testing wherein it can be used to measure curvature of field, chromatic aberrations with the use of filters, spherical aberrations and coma and evaluating the image forming characteristics of an image forming device. In the testing of cameras it can be used to define the plane of best focus. With infrared sensing elements the device can be used to test lenses and cameras designed for infrared photography. Similarly, it is useful to test the lenses of cameras designed for use with ultraviolet light. It is useful to control the automatic focusing of enlargers and copy cameras and is equally applicable in autofocusing cameras and telescopes where the object is located at infinity.

Equipment incorporating the present invention is extremely sensitive, responding to a slight finger pressure on the lens board and producing a full scale deflection of the meter for only a fraction of a millimeter change in image distance.

If the pressure is held constant, the deflection of the meter needle remains constant. This represents a constant change in the distance between object and lens. Furthermore, the meter responds to transient vibrations induced by the application of pressure, during which time there is oscillatory movement of the image with respect to the surface of the photoelectric element. Due to the inherent time lag of the photoelectric element, such motion is integrated with respect to time and has the identical effect as a defocused image, causing the needle to recede from the maximum deflection which was obtained in the static condition. It is therefore evident that the present invention can be used to detect the presence of image motion, since it contributes to the formation of an unsharp image. Since the meter reading is quantitative, the amount of motion can be reduced in addition to the mere detection of its presence.

The invention is applicable to the detection of coincidence between two similar images projected upon the surface of one of the photoconductive surfaces. One way of producing two such similar images would be to place an opaque strip along a diameter of a lens so that when defocused, two images will appear on the photoconductive surface. When a condition of focus prevails under such conditions, the two images will coincide producing maximum contrast and maximum deflection of the meter. Similarly, where two separate projection systems are employed involving their own lenses and transparencies, and images of the two transparencies are projected to the same plane, registry of the two images can be detected precisely with the methods and apparatus of the present invention.

A pair of such photocells can be arranged to respond to identical areas of the same image by the use of a beam splitter or by stacking two of the photocells one above the other in such a way that the upper one absorbs only a portion of the radiation and transmits a portion to the photocell disposed below it. Such arrangements render it possible to use images from any object desired and will not be restricted to images of repetitive patterns. Accordingly, this invention is widely applicable to the adjustment of images to optimum degrees of sharpness in the focal planes of cameras, enlargers, telescopes, rangefinders, microscopes, projectors, and any other optical systems in which real images are formed.

Whereas the major applications contemplated involve wavelengths ordinarily referred to as light, the present invention is suitable for use with infrared and ultraviolet radiations outside of the visible spectrum.

Whereas only a limited number of examples have been described with reference to the accompanying drawings, many more applications of the invention will be suggested to those skilled in the art and accordingly, the scope of the invention should be construed in the light of the appended claims.

What is claimed is:

1. A method of determining the accuracy of focus of an image comprising the steps of:
   positioning the light sensitive surface of a first photoconductive element in a position where it will be exposed to at least part of the light comprising the image;
   positioning the light sensitive surface of a second photoconductive element in a position where it will be exposed to at least part of the light comprising the image;
   varying the sharpness of the image received by the first and second photoconductive elements; and
   simultaneously comparing the conductance of the first and second photoconductive elements.

2. The method of claim 1 wherein the step of positioning the second photoconductive element comprises:
   disposing the light sensitive surface of a second photoconductive element in a plane parallel to and spacially displaced from the plane defined by the light sensitive surface of the first photoconductive element.

3. The method of claim 2 wherein the step of varying the sharpness of the image comprises:
   focusing the image about a plane disposed between the planes defined by the light sensitive surfaces of the first and second photoconductive elements.

4. A method of determining the accuracy of focus of an image comprising the steps of:
   positioning the light sensitive surface of a first photoconductive element in a position where it will be exposed to at least part of the light comprising the image;
   positioning the light sensitive surface of a second photosensitive element in a position where it will be exposed to at least part of the light comprising the image;
   varying the sharpness of the image received by the first photoconductive element whereby the conductance of the first photoconductive element will change with the contrast of the image;
   varying the average illumination received by the second photosensitive element; and
   simultaneously comparing the response of the first and second elements to the light incident thereon.

5. The method of claim 4 further comprising the step of:
   interposing a light diffusing medium in front of the light sensitive surface of the second element.

6. The method of claim 5 wherein the step of positioning the second element comprises:
   disposing the light sensitive surface of the second element adjacent to and substantially in the plane defined by the light sensitive surface of the first photoconductive element.

References Cited

UNITED STATES PATENTS

| | | |
|---|---|---|
| 1,794,222 | 2/1931 | Whitney. |
| 2,286,471 | 6/1942 | Dahl. |
| 2,818,775 | 1/1958 | Ullrich. |
| 2,831,057 | 4/1958 | Orthuber. |
| 3,035,176 | 5/1962 | Kis et al. |
| 3,041,459 | 6/1962 | Greene. |

RONALD L. WIBERT, Primary Examiner

V. P. McGRAW, Assistant Examiner

U.S. Cl. X.R.

95—44; 353—101; 356—123

UNITED STATES PATENT OFFICE
CERTIFICATE OF CORRECTION

Patent No. 3,562,785          Dated February 9, 1971

Inventor(s) Dwin R. Craig

It is certified that error appears in the above-identified patent and that said Letters Patent are hereby corrected as shown below:

Col. 2, line 56:   Change "protection" to --projection--

Col. 4, line 8:   Change "photocell;" to --photocell 36;

Col. 6, line 59:   Change "reduced" to --deduced--.

Signed and sealed this 18th day of May 1971.

(SEAL)
Attest:

EDWARD M. FLETCHER, JR.          WILLIAM E. SCHUYLER,
Attesting Officer          Commissioner of Patent